United States Patent [19]

Tamura et al.

[11] Patent Number: 4,796,951

[45] Date of Patent: * Jan. 10, 1989

[54] AUTOMOTIVE SEAT

[75] Inventors: Hisao Tamura; Shuichi Tokumitsu; Yuji Tagawa, all of Kanagawa, all of Japan

[73] Assignee: Ikeda Bussan Co., Ltd., Ayase, Japan

[*] Notice: The portion of the term of this patent subsequent to Mar. 10, 2004 has been disclaimed.

[21] Appl. No.: 855,621

[22] Filed: Apr. 25, 1986

[30] Foreign Application Priority Data

Apr. 27, 1985 [JP] Japan .................................. 60-91585

[51] Int. Cl.⁴ ............................................. B60N 1/023
[52] U.S. Cl. .................................. 297/337; 188/82.2; 188/82.77; 248/429; 297/344
[58] Field of Search ............... 297/337, 340, 341, 344; 248/393, 424, 429; 188/82.2, 82.4, 82.7, 87.77; 192/8 R

[56] References Cited

U.S. PATENT DOCUMENTS

| 534,883 | 2/1895 | Hoepner | 192/8 R |
|---|---|---|---|
| 1,572,635 | 2/1926 | Bostwick | 192/8 R |
| 2,942,646 | 6/1960 | Himka et al. | 297/341 |
| 4,152,024 | 5/1979 | Farelli | 297/341 |
| 4,401,343 | 8/1983 | Schmidt | 297/337 X |
| 4,432,583 | 2/1984 | Russo et al. | 297/337 X |
| 4,440,442 | 4/1984 | Drouillard | 297/341 |

FOREIGN PATENT DOCUMENTS

| 327448 | 4/1930 | United Kingdom | 297/337 |
|---|---|---|---|
| 634771 | 3/1950 | United Kingdom | |
| 2074442 | 11/1981 | United Kingdom | |

Primary Examiner—Kenneth J. Dorner
Assistant Examiner—Peter R. Brown
Attorney, Agent, or Firm—Foley & Lardner, Schwartz, Jeffery, Schwaab, Mack, Blumenthal & Evans

[57] ABSTRACT

In an automotive seat having a main slide mechanism by which the entire of the seat is movable to a desired position relative to a vehicle floor, there is provided an auxiliary slide mechanism which is arranged between the main slide mechanism and a seat cushion of the seat to adjust the position of the seat cushion in the fore-and-aft direction relative to a movable member of the main slide mechanism. The auxiliary slide mechanism comprises a first rectangular frame structure secured to the movable member of the main slide mechanism, a second rectangular frame structure slidably disposed on the first rectangular frame structure and mounting thereon the seat cushion, and an operating device for adjusting the position of the second frame structure relative to the first frame structure.

8 Claims, 2 Drawing Sheets

AUTOMOTIVE SEAT

BACKGROUND OF THE INVENTION

1. Field of the Invention

The present invention relates in general to an automotive seat, and more particularly to an automotive seat with a seat sliding mechanism. More specifically, the present invention is concerned with an automotive seat having a main sliding mechanism for achieving a position adjustment of the entire of the seat in the fore-and-aft direction and an auxiliary sliding mechanism for achieving a position adjustment of a seat cushion proper in the fore-and-aft direction relative to the main sliding mechanism.

2. Description of the Prior Art

Hitherto, in order to provide a seat occupant with a comfortable sitting posture, there have been proposed various kinds of automotive seats. Some of them are of a type which, as is shown in FIG. 3, has both a main sliding mechanism for achieving a position adjustment of the entire of the seat in the fore-and-aft direction and an auxiliary sliding mechanism for achieving a position adjustment of a seat cushion proper in the fore-and-aft direction relative to the main sliding mechanism. The prior art seat shown in FIG. 3 comprises generally a seat cushion A, a reclinable seat back B, a main sliding mechanism C mounted on a vehicle floor D and mounting thereon the entire of the seat and an auxiliary sliding mechanism E arranged on the main sliding mechanism C. The main sliding mechanism C moves the entire of the seat into a desired position in the fore-and-aft direction relative to the vehicle floor D, while the auxiliary sliding mechanism E moves only the seat cushion A into a desired position as is understood from the positions of the seat cushion A illustrated by phantom lines. With the provision of the auxiliary sliding mechanism E by which the positional relation or the distance between the seat cushion A and the seat back B is changeable, more comfortable sitting posture is given to the seat occupant. That is, when the seat cushion A assumes its rear position illustrated by the phantom line, the pressure applied to the thigh portions of the seat occupant by the seat cushion A is softened allowing easier movement of his or her legs. On the contrary, when the seat cushion A assumes its front position illustrated by the solid line, the seat occupant can sit back serenely in the seat.

However, in the conventional seats of the type as mentioned hereinabove, manipulation of the auxiliary sliding mechanism E is not easy because of complicated construction thereof. Furthermore, the parts of the auxiliary sliding mechanism E are unsystematically arranged on a frame of the seat cushion and the main sliding mechanism without considering easiness with which the mechanism is assembled. Thus, in fact, complicated and troublesome steps are required for assembling the mechanism E. Furthermore, such unsystematic arrangement makes the interchangeability of the mechanism E difficult.

SUMMARY OF THE INVENTION

It is therefore an essential object of the present invention to provide a seat which is free of the above-mentioned drawbacks.

According to the present invention, there is provided a seat assembly arranged on a floor. The assembly comprises a main slide mechanism including two parallel stationary rails mounted on the floor and two parallel movable rails slidably disposed on the stationary rails, an auxiliary slide mechanism on the movable rails to move therewith, a generally rectangular second frame structure slidably disposed on the first frame structure, an operating device for adjusting the position of the second frame structure relative to the first frame structure to move therewith and a seatback mounted on the movable rails of the main slide mechanism to move therewith. The operating device comprises a shaft supported by a given portion of the first frame structure and rotatable about its axis, a first gear secured to the shaft to rotate therewith, a rack secured to the second frame structure and meshed with the first gear so that rotation of the shaft about its axis induces a sliding movement of the second frame structure relative to the first frame structure, a second gear secured to the given portion of the first frame structure, a latch device rotated together with the shaft and lockingly engageable with the second gear to lock the shaft to the fixed second gear, and a lock cancelling device pivotally disposed about the shaft and disengaging the latch device from the second gear when rotated by a given angle about the shaft.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
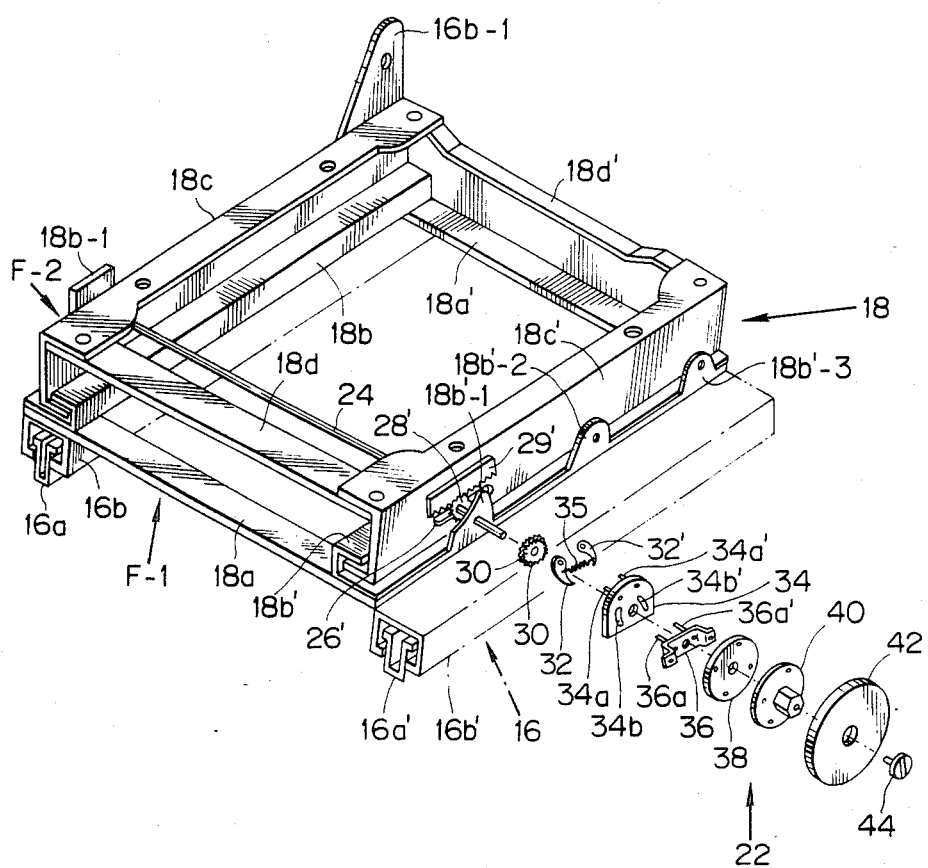
FIG. 1 is a partially exploded perspective view of an auxiliary sliding mechanism used in a seat according to the present invention, with a main sliding mechanism partially shown.
Figure 2:
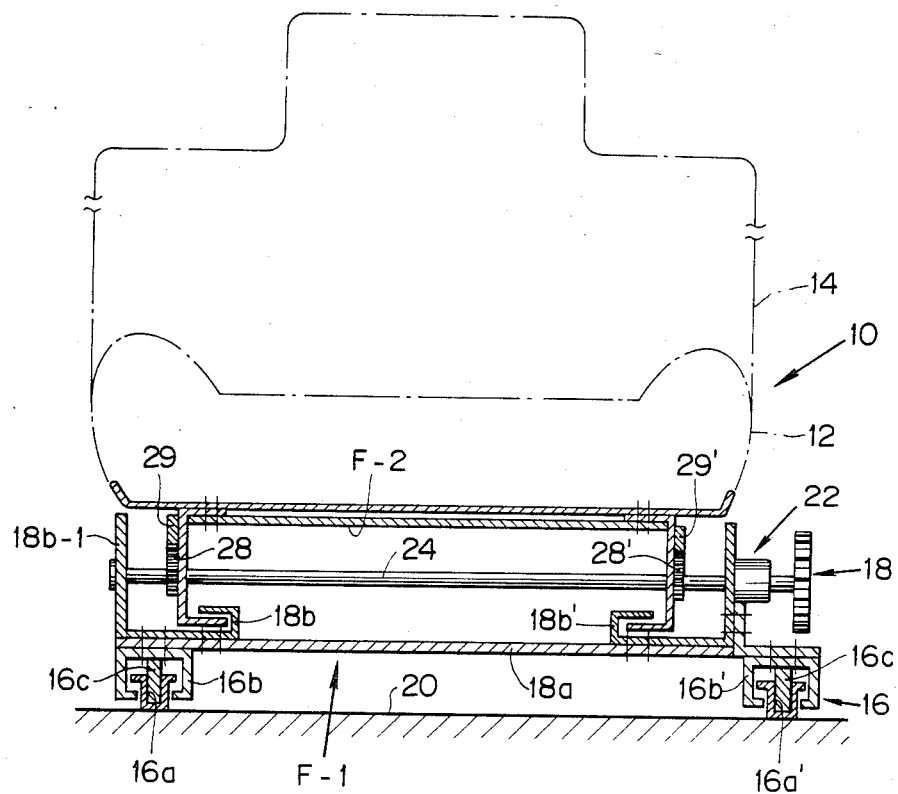
FIG. 2 is a sectional view of the seat of the present invention.
Figure 3:
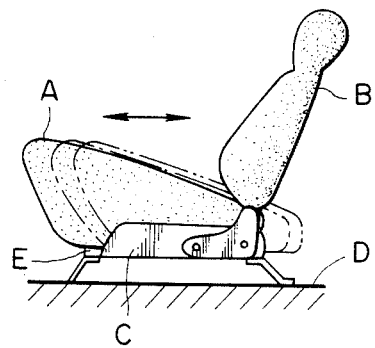
FIG. 3 is a side view of the prior art seat which has been described hereinabove.

Referring to FIGS. 1 and 2, particularly FIG. 2, there is shown a seat 10 according to the present invention.

As is seen from FIG. 2, the seat 10 comprises generally a seat cushion 12, a reclinable seat back 14, a main sliding mechanism 16 for adjusting the position of entire of the seat 10 in the fore-and-aft direction relative to a vehicle floor 20 and an auxiliary sliding mechanism 18 for adjusting the position of the seat cushion 12 in the fore-and-aft direction relative to the main sliding mechanism 16.

For easy understanding, the main sliding mechanism 16 will be described first with reference to FIG. 2. The mechanism 16 comprises a pair of stationary rails 16a and 16a' secured to the vehicle floor 20, and a pair of movable rails 16b and 16b' slidably disposed on the stationary rails 16a and 16a'. Suitable rollers 16c and 16c' are disposed between the paired stationary and movable rails 16a and 16b (and 16a' and 16b') for achieving smooth movement of the movable rails 16b and 16b relative to the stationary rails 16a and 16a'. Although not shown in the drawings, a known locking device is incorporated with the main sliding mechanism 16 to lock the movable rails 16b and 16b' at a desired position relative to the stationary rails 16a and 16a'. Designated by reference 16b-1 in FIG. 1 is a bracket connected to a rear portion of the movable rail 16b for pivotally connecting thereto a lower portion of the seat back 14.

The auxiliary sliding mechanism 18 is mounted on the main sliding mechanism 16 to move with the movable rails 16b and 16b', which comprises, as is shown in FIG. 1, two spaced cross members 18a and 18a' which extend across the movable rails 16b and 16b' and securely connect to the same. Two spaced channel guide members 18b and 18b' extend across the cross members 18a and 18a' and securely connect to the same in a manner to form a generally rectangular first frame structure F-1. As is seen from the drawings, each of the channel members 18b and 18b' has a wider lower wall and is so arranged that the groove thereof faces outwardly. The channel member 18b has a vertical bracket 18b-1 extending upwardly from the wider lower wall thereof, while the other channel member 18b' has three axially spaced vertical brackets 18b'-1, 18b'-2 and 18b'-3 each extending upwardly from the wider lower wall thereof. As is best understood from FIG. 2, each bracket 18b-1, 18b'-1, 18b'-2 or 18b' distance from the corresponding side frame which will be described hereinafter. Although not shown in the drawings, a known reclining device is bolted to the brackets 18b'-2 and 18b'-3 (see FIG. 1), to which a lower portion of the seat back 14 is operatively connected. Thus, it will be appreciated that the seat back 14 is tiltable relative to the above-mentioned rectangular first frame structure which is slidable relative to the vehicle floor.

Two laterally spaced side frames 18c and 18c' are incorporated with the channel guide members 18b and 18b' in a manner to be axially slidable relative to the same. That is, as is seen from the drawings, each of the side frames 18c and 18c' has at the lower portion thereof an inwardly bent portion (no numeral) which is slidably received in the groove of the corresponding channel guide member 18b or 18'b. Preferably, the inwardly bent portions of the side frames 18c and 18c' are lined with lubricating plastics. Each frame 18c or 18c' further has at the upper portion thereof another inwardly bent flat portion (no numeral) on which the seat cushion 12 is mounted as is seen from FIG. 2. Two cross members 18d and 18d' extend across the side frames 18c and 18c' and securely connect to the same in a manner to form a generally rectangular second frame structure F-2. Thus, it will be appreciated that the second frame structure F-2 is axially movable relative to the first frame structure F-1 (viz., to the seat back 14) which, in turn, is axially movable relative to the stationary rails 16a and 16a' (viz., the vehicle floor 20).

In the following, an operating device 22 of the auxiliary sliding mechanism will be described.

As will be understood from FIG. 1, the operating device 22 comprises an elongate shaft 24 which extends across the side frames 18c and 18c' having both ends thereof projected outwardly therefrom and rotatably supported by the brackets 18b-1 and 18b'-1 respectively. For this, each side frame 18c or 18c' is formed with an axially extending elongate slot 26 or 26' through which the shaft 24 passes. Two pinions 28 and 28' are coaxially secured to the shaft 24 near the respective slots 26 and 26' to rotate therewith, as is seen from FIG. 2.

Operatively engaged with the pinions 28 and 28' are respective racks 29 and 29' which are secured to the side frames 18c and 18c'. Thus, it will be appreciated that rotation of the shaft 24 about the axis thereof induces axial movement of the second frame structure F-2 relative to the first frame structure F-1. A gear 30 is secured to the bracket 18b'-1 in a manner to be coaxial with the shaft 24. For this, the gear 30 has a center opening (no number) through which the shaft 24 passes. Lockingly engageable with the gear 30 are a pair of latch pawls 32 and 32'. The latch pawls 32 and 32' are pivotally supported by respective pins 34a and 34a' secured to a cancel plate 34 which is secured to the shaft 24. A spring 35 is expanded between the latch pawls 32 and 32' to bias them toward each other, that is, toward the teeth of the gear 30 from opposed directions. It is to be noted that the latch pawls 32 and 32' are so constructed and arranged that, upon engagement with the gear 30, rotation of the shaft 24 in both directions is suppressed by them respectively. More particularly, one latch pawl 32 suppresses rotation of the shaft 24 with respect to the gear 30 in a clockwise direction as viewed in FIG. 1, while the other latch pawl 32' suppresses rotation of the gear 30 in a counterclockwise direction.

The cancel plate 34 is formed with two arcuate slots 34b and 34b' which are arranged to be concentric with the shaft 24. Passed through the arciate slots 34b and 34b' are respective cancel pins 36a and 36a' which are secured to a bracket 36 which is rotatably disposed on the shaft 24. The leading ends of the cancel pins 36a and 36a' project into a space defined between the latch pawls 32 and 32'. The bracket 36 is secured to a circular knob 42 through two circular plates 38 and 40. A bolt 44 is used for securing the circular knob 42 to the circular plate 40. It is thus to be noted that the bracket 36, the circular plates 38 and 40 and the circular knob 42 constitute a unit which is rotatable about the shaft 24 within an angular range determined by the longitudinal length of each arcuate slot 34b or 34b' of the cancel plate 34. However, as will become apparent as the description proceeds, when manipulated with a considerable force, the knob 42 is rotated to rotate the shaft 24 by a certain degree thereby to induce an axial movement of the second frame structure F-2 in one direction relative to the first frame structure F-1.

In the following, operation of the auxiliary sliding mechanism 18 will be described. For easier understanding, the description will be commenced with respect to a condition wherein the knob 42 is in its rest condition, that is, the knob 42 is released from operator's hand. Under this condition, the latch pawls 32 and 32' are lockingly engaged with the gear 30 under the force of the spring 35 thereby locking the second frame structure F-2 to the first frame structure F-1.

When, for example, the knob 42 is manipulated to rotate in a counterclockwise direction in FIG. 1, the cancel pins 36a and 36a' move in and along the corresponding arcuate slots 34b and 34b' cancel plate 34 and come into abutment with forward extreme ends of the same. Thus, further rotation of the knob 42 in the same direction causes the cancel plate 34 to rotate in the same direction and causes the cancel pin 36a' to disengage the latch pawl 32' from the gear 30 permitting a counterclockwise rotation of the shaft 24. Thus, by the rotation of the knob 42, the second frame structure F-2 is moved forward, that is, leftward in FIG. 1, together with the seat cushion 12 relative to the first frame structure F-1, that is, relative to the main sliding mechanism 16. When the knob 42 is released from the operator's hand, the latch pawl 32' is brought into locking engagement with the gear 30 turning the cancel pin 36a' back to its neutral position due to the work of the spring 35. Thus, the second frame structure F-2 is locked at the newly set position.

When now the knob 42 is turned in the reversed direction, that is, in a clockwise direction in FIG. 1, the other cancel pin 36a disengages the other latch pawl 32 from the gear 30 against the spring 35 thereby permitting a clockwise rotation of the shaft 24. Thus, further rotation of the knob 42 in the same direction induces a rearward movement of the second frame structure F-2. Upon release of the knob 42, the latch pawl 32 becomes engaged with the gear 30 in the same manner as is described hereinabove. Thus, the second frame structure F-2 is locked at this new position.

It is to be noted that the position adjustment of the entire of the seat 10 relative to the vehicle floor 20 is carried out by the main sliding mechanism 16 in a known manner.

In the following, advantages of the present invention will be itemized.

Since the auxiliary sliding mechanism 18 is constructed as a unit, assembly of the same in the seat 10 is facilitated. That is, for mounting the unit 18 to the seat 10, it can be simply installed between the main sliding mechanism 16 and the seat cushion 12. In other words, because of the unit construction, interchangeability of the same is improved. That is, if the unit is damaged for some reasons, it is easily replaced with a new one.

Because of the rigid rectangular frame structure of the auxiliary slide mechanism 18, the entire of the seat 10 is tightly mounted on the main sliding mechanism 16 without play.

Since the mechanism 18 is simple in construction, the same and thus the entire of the seat can be manufactured at a low cost.

What is claimed is:

1. A seat assembly arranged on a floor, comprising a main slide mechanism including two parallel stationary rails mounted on said floor and two parallel movable rails slidably disposed on said stationary rails, and an auxiliary slide mechanism including a generally rectangular first frame structure mounted on said movable rails to move therewith, a generally rectangular second frame structure slidably disposed on said first frame structure, an operating device for adjusting the position of said second frame structure relative to said first frame structure, a seat cushion mounted on said second frame structure to move therewith and a seatback mounted on said movable rails of the main slide mechanism to move therewith, wherein said operating device comprises:

a shaft supported by a given portion of said first frame structure and rotatable about its axis;

a first gear secured to said shaft to rotate therewith;

a rack secured to said second frame structure and meshed with said first gear so that rotation of said shaft about its axis induces a sliding movement of said second frame structure relative to said first frame structure;

a second gear secured to said given portion of the first frame structure;

a lock device rotated together with said shaft and lockingly engageable with said second gear to lock the shaft to the fixed second gear; wherein said lock comprises;

a pawl mounting piece secured to said shaft for rotation therewith and mounted adjacent said second gear; and a pair of pawls rotatably mounted on said pawl mounting piece, one of said pawls adapted to engaged said second gear so to prevent rotation in one direction and the other of said pawls adapted to engage said second gear so as to prevent rotation of said second gear in the opposite direction and a lock cancelling device pivotally disposed about said shaft and disengaging said latch device from said second gear when rotated by a given angle about the shaft, wherein said lock cancelling device comprises;

a lock cancelling device pivotally disposed about said shaft and disengaging said latch device from said second gear when rotated by a given angle about the shaft, wherein said lock cancelling device comprises:

a rotation knob rotatably mounted on said shaft; and a bracket fixedly secured to said rotation knob and having two pins projecting in the axial direction of said shaft, said pins adapted to pass through corresponding slots in said pawl mounting piece and selectively disengage said pawls.

2. An automotive seat as claimed in claim 1, in which said auxiliary slide mechanism further comprises guide means for guiding the sliding movement of said second frame structure relative to said first frame structure.

3. An automotive seat as claimed in claim 2, in which said guide means comprises:

means for defining grooves which are respectively formed in opposed side portions of said first frame structure; and means for defining projections which are respectively formed on opposed side portions of said second frame structure, said projections being slidably received in said grooves respectively.

4. An automotive seat as claimed in claim 3, in which said first frame structure comprises two cross members which extend across the movable rails and securely connect to the same, and two channel guide members which extend across said two cross members and securely connect to the same, said two channel guide members serving as said opposed side portions of said first frame structure.

5. An automotive seat as claimed in claim 4, in which said second frame structure comprises two side frame members which are respectively formed with inwardly bent portions which serve as said projections of said second frame structure, and two cross members which extend across said side frame members and securely connect to the same.

6. An automotive seat as claimed in claim 5, in which said two side frame members of said second frame structure are further formed with respective flat portions on which said seat cushion is mounted.

7. A seat assembly as claimed in claim 1, further comprising:

a tensioning member biasing said pawls to rotate towards on another.

8. A slide control apparatus for a seat assembly having at least a first and a second rail slidable relative to one another and a seat secured to one of the rails, comprising:

a shaft rotatably supported within the first rail;

a first gear fixedly secured to said shaft for rotation therewith;

a rack secured to the second rail and meshed with said first gear so that, upon rotation of said shaft, said second rail slides relative to said first rail; and means for selectively permitting sliding movement of the second rail relative to the first rail in one direction while preventing movement in an opposite direction, wherein said means for selectively permitting sliding movement comprises:

a pawl gear fixedly secured to the first rail;

a pawl mounting piece secured to said shaft for rotation therewith and mounted adjacent said pawl gear;

a pair of pawls mounted on said pawl mounting piece and biased towards one another by a tensioning member, said pawls adapted to engage said pawl gear to prevent rotation of said shaft; and a pawl disengaging means operable to selectively disengage either of said pawls from said pawl gear so as to permit rotation of said shaft in one direction only, wherein said pawl disengaging means comprises a bracket having a pair of pins insertable through corresponding slots in said pawl mounting piece, for imparting rotation to said pawl mounting piece and for respectively disengaging one of said pawls, and means for rotatably mounting said bracket on said shaft adjacent said pawl mounting piece.

* * * * *